(12) United States Patent
Wu et al.

(10) Patent No.: US 6,487,162 B1
(45) Date of Patent: Nov. 26, 2002

(54) DISC CLAMPING DEVICE WITH SELF LOCK ELEMENTS

(75) Inventors: Min-Der Wu, Taichung (TW); Wan-Wen Chiu, Taichung (TW); Hsu-Pin Pan, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/556,891

(22) Filed: Apr. 20, 2000

(30) Foreign Application Priority Data

Mar. 1, 2000 (TW) ........................................ 89103588 A

(51) Int. Cl.[7] ............................................. G11B 17/028
(52) U.S. Cl. ........................................ 369/271; 369/270
(58) Field of Search ................................ 369/271, 270, 369/291, 264

(56) References Cited

U.S. PATENT DOCUMENTS

| | | | | |
|---|---|---|---|---|
| 5,555,233 A | * | 9/1996 | Yano et al. ................. | 369/270 |
| 5,907,533 A | * | 5/1999 | Choi ........................... | 369/271 |
| 6,011,773 A | * | 1/2000 | Guerini et al. | |
| 6,038,206 A | * | 3/2000 | Mukawa ...................... | 369/271 |
| 6,041,033 A | * | 3/2000 | Otsubo et al. ............... | 369/271 |
| 6,249,506 B1 | * | 6/2001 | Oowaki et al. ............. | 369/271 |

* cited by examiner

*Primary Examiner*—Allen Cao
*Assistant Examiner*—Dzung C. Nguyen
(74) *Attorney, Agent, or Firm*—W. Wayne Liauh

(57) ABSTRACT

A disc clamping device with self lock elements particularly for DVD-ROM or CD-ROM fixedly maintained on a turntable when disc is rotating in high speed. The device comprises a turntable having a boss on the center for putting disc thereon, and a disc clamping member tightly sleeved on boss having protuberances on periphery wherein protuberances are deformed inwards when biased by disc such that disc can insert through disc clamping member, and then protuberances return to original forms by elastically energized force for clamping disc on turntable. By utilizing this, the purposes of decreasing the umber of parts, easy assembly, and high precision positioning of disc are achieved.

7 Claims, 5 Drawing Sheets

DISC CLAMPING DEVICE WITH SELF LOCK ELEMENTS

BACKGROUND OF THE INVENTION

1. Field of Invention

The present invention relates to a slim size disc clamping device particularly for DVD-ROM or CD-ROM mounted in notebook computer being fixedly maintained on a turntable when disc is rotating in high speed.

2. Related Art

Conventionally, the mechanism of employing elastic O-ring or torsion spring to bias steel balls is adopted to clamp disc. This conventional disc clamping device is shown in a top view in FIG. 1A and a sectional view in FIG. 1B respectively. As shown, elastic O-ring 14 is inserted around an outer side of a cylindrical axis 12 projected to the upper surface of turntable 10. A plurality of steel balls 18 (e.g., 3) are equally distributed along the circumference of junction of guide member 16 and turntable 10. In mounting a disc (not shown) onto turntable 10, disc is pressed down to force steel balls 18 to bias O-ring 14 toward the inside by the guidance of guide member 16 until in place. At this time, the inner periphery of disc is fixedly maintained between guide member 16 and turntable 10 by the expansion of O-ring 14 which biases steel balls 18 to original positions. The drawbacks of such design are that O-ring 51 loses its elasticity as time passes, and O-ring 14 and steel balls 18 may not engage well due to poor manufacturing quality. As a result, a fix clamp of disc is not achievable.

Another prior art disc clamping device is shown in sectional views of FIGS. 2A and 2B. As shown in FIG. 2A, disc 20 is placed on top of insertion portion 22 of turntable 10a for clamping onto turntable 10a. In mounting, press down disc 20 to force it to contact with turntable 10a so as to clamp disc 20 between disc-clamping piece 24 and turntable 10a by the guidance of disc-clamping piece 24. Then turntable 10a immediately bounces up when disc 20 is not pressed for fixedly maintaining disc 20 between and by disc-clamping piece 24 and turntable 10a (see FIG. 2A). This design is without the problem of lacking elasticity of spring as time passes. But this is still unsatisfactory for the purpose for which the present invention is concerned because the radially positioning of disc is poor. It is known that not all central holes of discs have the same tolerance. However, above design does not provide a mechanism to compensate such tolerance for providing a precise positioning. As a result, such disc clamping device is not applicable to high precision positioning products such as DVDs.

SUMMARY OF THE INVENTION

It is thus an object of the present invention to provide a disc clamping device with self lock elements particularly for DVD-ROM or CD-ROM being fixedly maintained on a turntable when disc is rotating in high speed.

The advantages of the present invention are realized by providing a disc clamping device comprising a turntable having a boss on the center for putting disc thereon; and a disc clamping member tightly sleeved on boss of turntable having a diameter nearly the same as that of the center hole of disc, and disc clamping member having a plurality of protuberances on periphery wherein protuberances are deformed inwards when biased by disc such that disc can insert through disc clamping member, and then protuberances return to original forms by elastically energized force for clamping disc on turntable.

In one aspect of the invention, the number of protuberances is three. Protuberances are spaced apart by 120 degrees each other. Protuberances may be formed integrally with disc clamping member, or alternatively formed of copper separately. An annular pad is provided on the outer periphery of the top surface of turntable for providing a frictional force to disc when rotating. Disc clamping member includes a plurality of spaced cantilever members along its periphery wherein a protuberance is located on the outer surface of a corresponding cantilever member. Preferably, the line from protuberance to the center of disc clamping member is at an angle about 10 to 60 degrees with respect to the line from base of cantilever member to the center of disc clamping member. Also, the line from the point of protuberance contacting disc to the top of protuberance is at an angle about 10 to 80 degrees with respect to a downward vertical line originated from the top of protuberance.

In another aspect of the invention, turntable is a copper and disc clamping member is a plastic. In mounting disc on disc clamping member, press down disc to force circular protuberances to bias cantilever members to cause it to deform inwards. Then disc inserts through disc clamping member to pass protuberances until contacting with pad. At this time, protuberances immediately expand outward to return to original forms by elastically energized force of cantilever members. As such, disc is clamped by protuberances and pad. Thus, disc is secured on turntable.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinbelow illustration only, and thus are not limitative of the present invention, and wherein.

DETAILED DESCRIPTION OF THE INVENTION

Figure 1A:
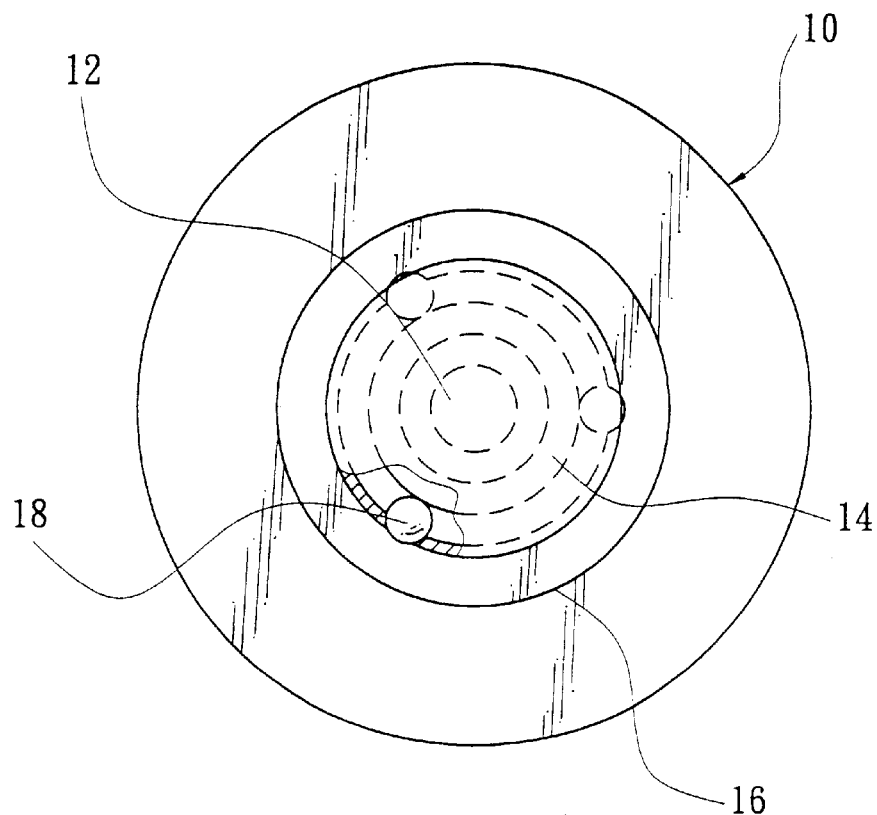
FIGS. 1A and 1B are top and sectional views of a conventional disc clamping device respectively.
Figure 1B:
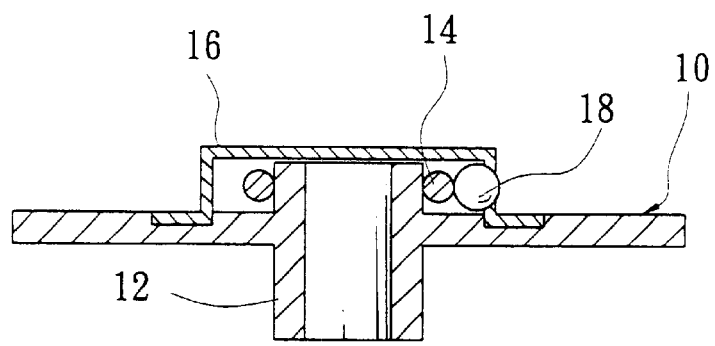
Figure 2A:
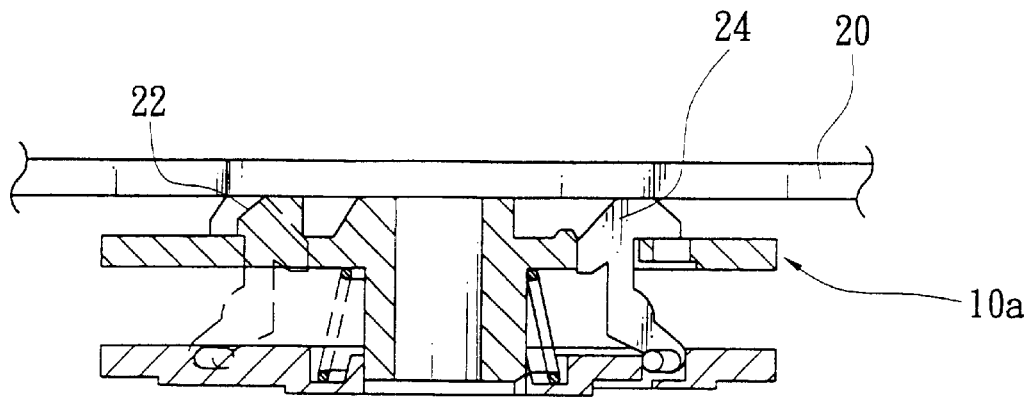
FIGS. 2A and 2B are sectional views of another conventional disc clamping device respectively.
Figure 2B:
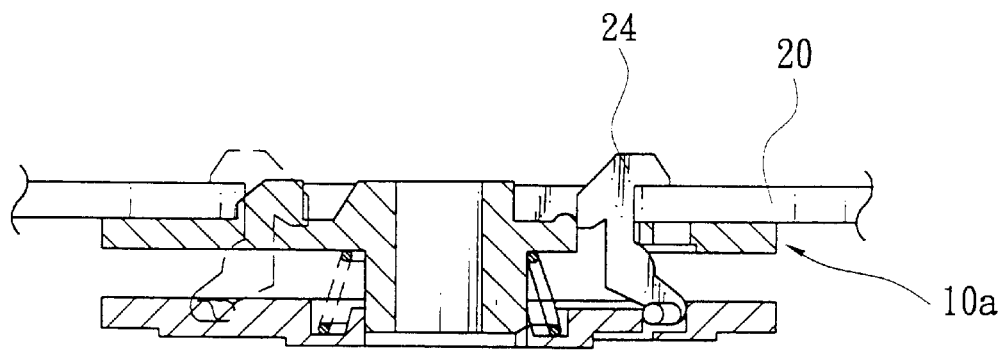
Figure 3:
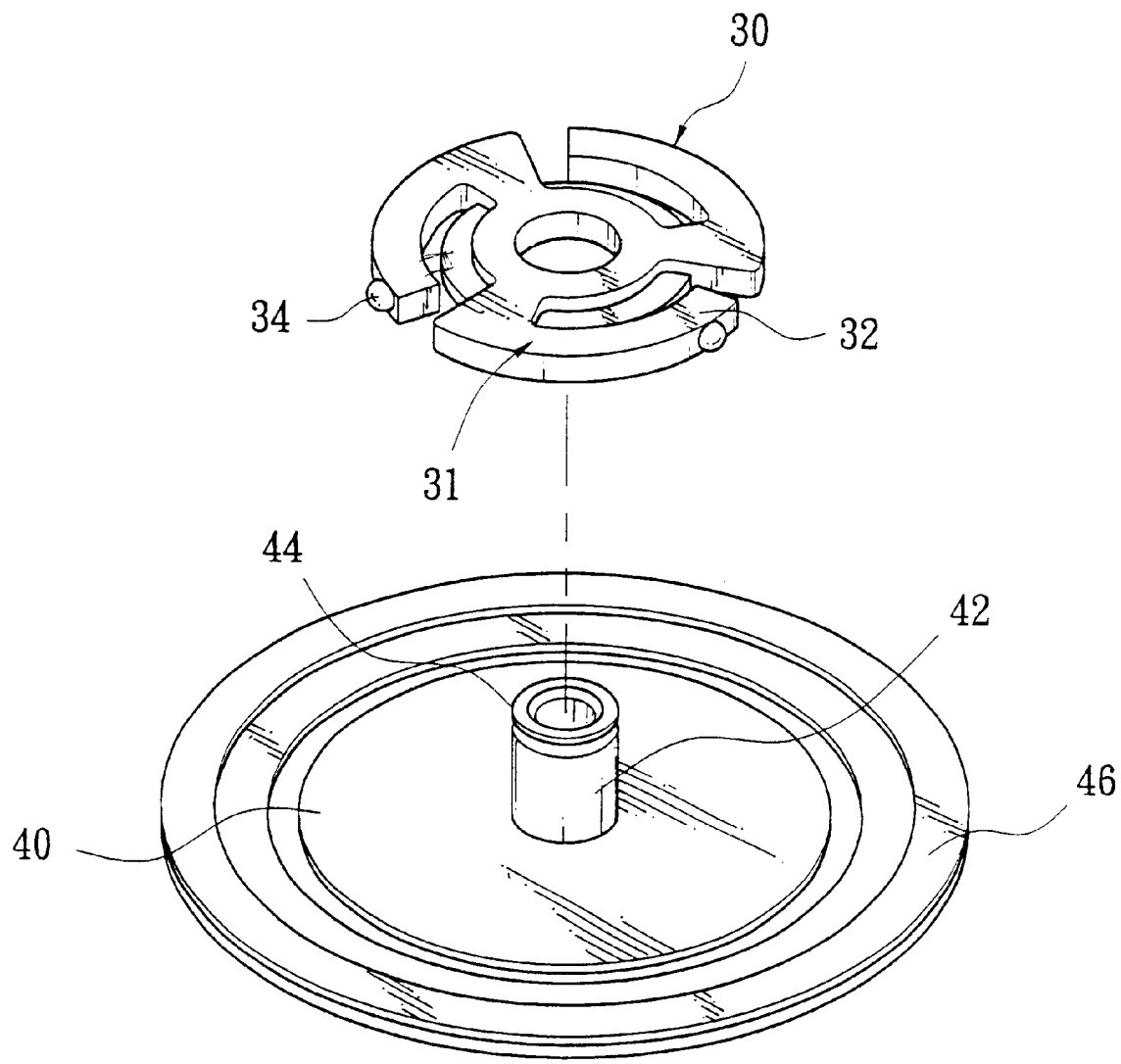
FIG. 3 is an exploded view of a first preferred embodiment of disc clamping device according to the invention.
Figure 4:
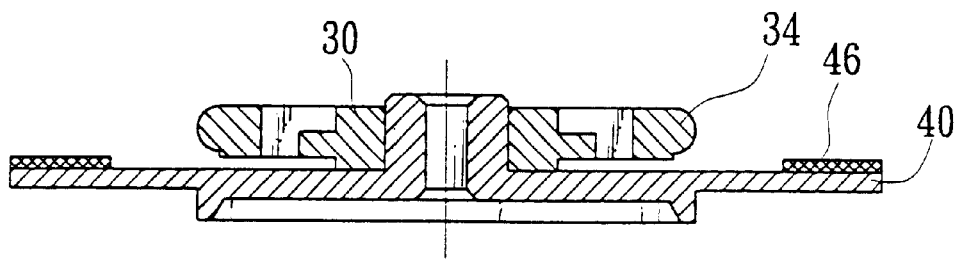
FIG. 4 is a sectional view of assembled disc clamping device shown in FIG. 3.

Referring to FIGS. 3 and 4, there is shown a disc clamping device constructed in accordance with the present invention comprising a disc clamping member 30 and a turntable 40. Below is a detailed description of above components.

Turntable 40 is provided on chassis (not shown) having a boss 42 driven by a motor (not shown). Disc clamping member has a diameter nearly the same as that of the center hole of disc 20 (see FIG. 5A). For tightly mounting disc 20 on boss 42, an annular flange 44 is provided on top of boss 42. The diameter of annular flange 44 is slightly larger than that of center hole of disc clamping member 30 which is also slightly smaller than that of boss 42. Further, disc clamping member 30 is plastic. As such, a tightly mounting of disc clamping member 30 on boss 34 is made possible. Moreover, the provision of annular flange 44 can prevent the separation of disc clamping member 30 from boss 42. In addition, annular pad 46 is provided on the outer periphery of the top surface of turntable 40 for providing a frictional force to disc 20 when rotating.

It is understood that disc clamping member 30 is the main clamping force exerted on disc 20. As such, it is important that disc clamping member 30 have the features of permitting an easy mounting of disc 20 and securing disc 20 on turntable 40. The invention is designed with objects of decreasing the number of parts and effecting an easy assembly.

As shown in FIG. 3, disc clamping member 30 includes a plurality of spaced cantilever members 32 along its periphery. These cantilever members 32 are formed by removing some portions of disc clamping member 30. As such, base 31 is connected between cantilever member 32 and the body of disc clamping member 30. As such, cantilever members 32 deform inwards (mainly) when biased by disc 20. A protuberance 34 is provided on the outer surface of a corresponding cantilever member 32. Protuberances 34 may be formed integrally with disc clamping member 30, or alternatively formed of copper separately. In one embodiment, the number of protuberances 34 is three and spaced apart by 120 degrees each other. Of course, the number of protuberances 34 may be four or more corresponding to the number of cantilever members 32. Preferably, protuberances 34 are equally spaced along the periphery of disc clamping member 30.

Figure 5A:
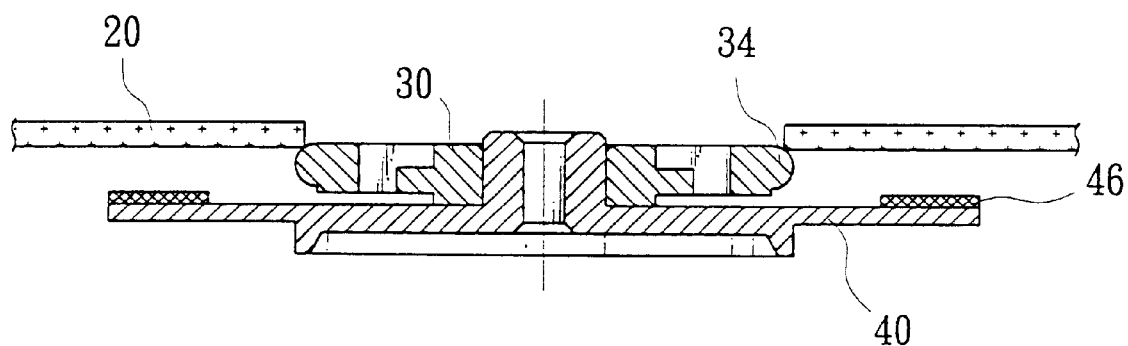
FIGS. 5A and 5B are sectional views illustrating the mounting of disc on turntable.
Figure 5B:
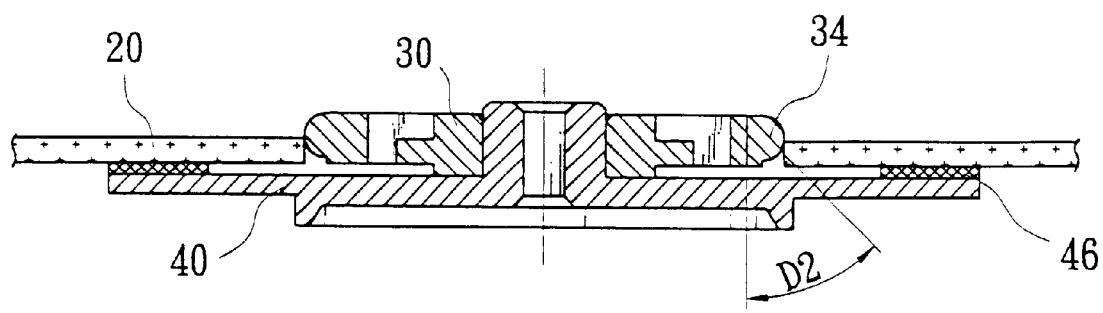
Figure 6:
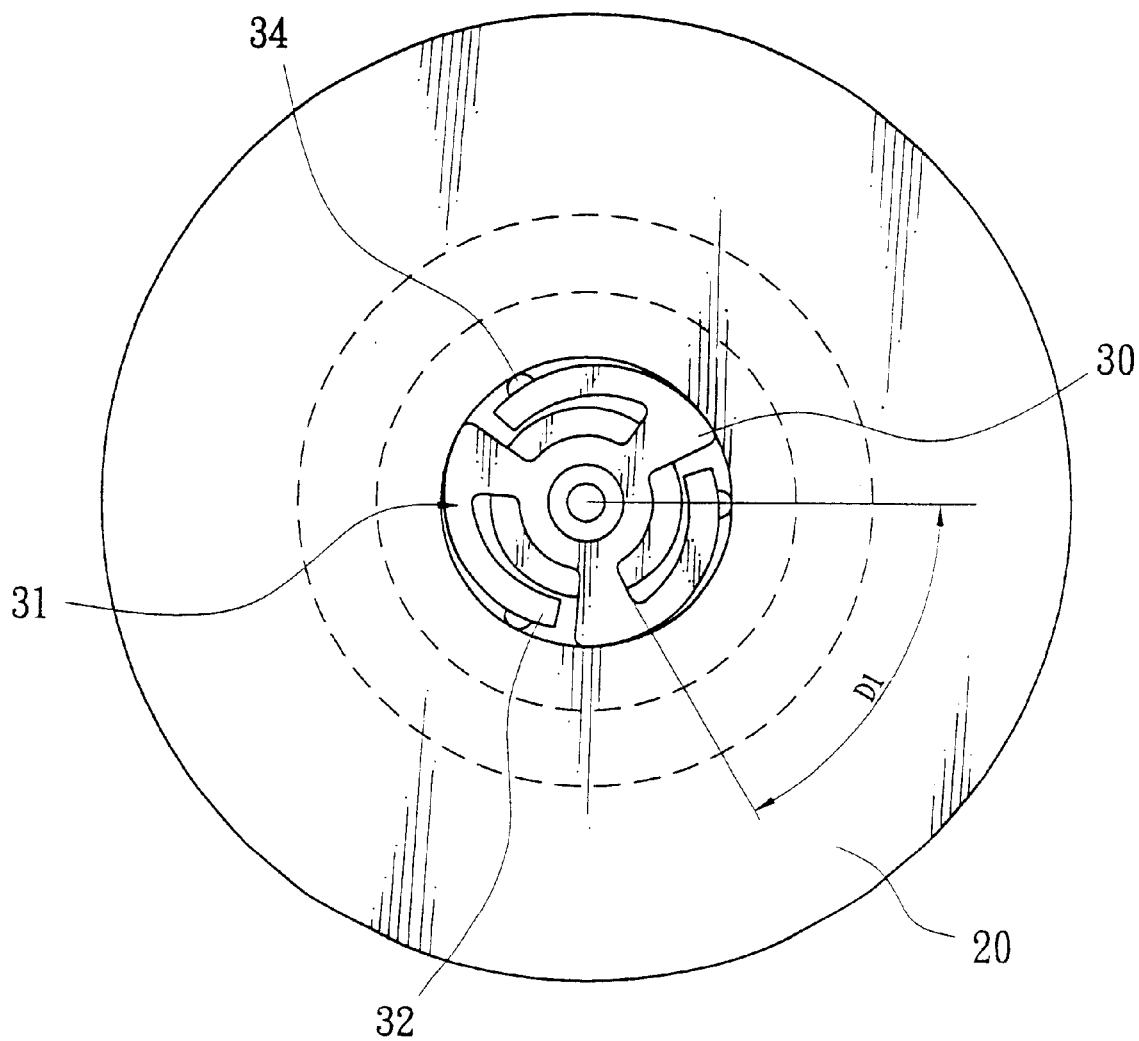
FIG. 6 is a top view of FIG. 5B showing bent cantilever members.

FIGS. 5A and 5B are sectional views illustrating the mounting of disc 20 on turntable 40. FIG. 6 is a top view of FIG. 5B showing bent cantilever members 32. By referring to FIGS. 5A, 5B, and 6, the operation of the disc clamping device of the invention will become more obvious.

As shown in FIG. 5A, in mounting disc 20 on disc clamping member 30, press down disc 20 so as to contact circular protuberances 34. Then protuberances 34 bias cantilever members 32 to cause it to deform inwards (FIG. 6). As stated above, the diameter of disc clamping member 30 is nearly the same as that of center hole of disc 20. As such, protuberances 34 are provided as an obstruction for accessing disc 20. Note that base 31 of disc clamping member 30 is not deformed when accessing disc 20. Then disc 20 inserts through disc clamping member 30 to pass protuberances 34 until contacting with pad 46. At this time, protuberances 34 immediately expand outward to return to original forms by elastically energized force of cantilever members 32. As such, disc 20 is clamped by protuberances 34 and pad 46. Thus, disc 20 is secured on turntable 40 as shown in FIG. 5B.

With the provision of cantilever members 32 and protuberances 34 of disc clamping member 30 and the configuration of disc clamping member 30 and disc 20, sufficient radial and axial clamping forces are exerted on mounted disc 20. In detail, clamping force comes from the outward elastically energized force of cantilever members 32 which deformed earlier. As such, elasticity of cantilever member 32 is a main factor contributing to such clamping force. In another aspect, the position of protuberance 34 contacting cantilever member 32 is also important. Preferably, the line from protuberance 34 to the center of disc clamping member 30 is at an angle D1 about 10 to 60 degrees with respect to the line from base 31 of cantilever member 32 to the center of disc clamping member 30. Also, the line from the point of protuberance 34 contacting disc 20 to the top of protuberance 34 is at an angle D2 about 10 to 80 degrees with respect to a downward vertical line originated from the top of protuberance 34.

As stated above, the radial clamping force of disc clamping member 30 on disc 20 can compensate tolerance in respect of thickness and diameter of center hole of disc 20 caused by poor manufacturing. Further, axial clamping force of disc clamping member 30 on disc 20 is also provided by disc clamping member 30.

Preferably, the number of protuberances 34 is three (with the benefit of easily positioned) or more (with the benefit of uniform clamping force on disc 20).

In this invention, the number of parts is decreased and an easy assembly is effected. Further, disc clamping member may be formed integrally. Further, the slim size of the invention can apply to high precision positioning products such as DVD-ROMs.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disc clamping device for clamping a disc with a center hole comprising:

a turntable having a boss on the center for putting the disc thereon; and a disc clamping member tightly sleeved on the boss having a diameter conformed to that of the center hole of the disc, and the disc clamping member including a plurality of cantilever members along its periphery, and a protuberance provided on an outer surface of each cantilever member;

wherein the protuberances are respectively located near an open end of the cantilevers, and the cantilevers are structured such that they are deformed inwardly when biased by the disc as the disc is being sleeved through the disc clamping member, causing the protuberances to be elastically energized to exert an urging force against the disc so as to forcefully clamp the disc on the turntable;

said disc clamping device further comprising an annular flange on the outer periphery of the top surface of the turntable for providing a frictional force to the disc when rotating; and a line from one of the protuberances to the center of the disc clamping member is at an angle ranging from 10 to 60 degrees with respect to a line from the base of the cantilever member to the center of the disc clamping member.

2. The disc clamping device of claim 1, wherein the number of the protuberances is three being spaced apart by 120 degrees each other.

3. The disc clamping device of claim 1, wherein the protuberances are formed integrally with the disc clamping member.

4. The disc clamping device of claim 1, wherein the protuberances are formed separately from the disc clamping member.

5. The disc clamping device of claim 4, wherein the protuberances are formed of copper.

6. The disc clamping device of claim 1, wherein the disc clamping member further comprises a plurality of spaced cantilever members along the periphery of the disc clamping member, wherein each of the protuberances is located on the outer surface of the corresponding cantilever member.

7. The disc clamping device of claim 1, wherein a line from the point of one of the protuberances contacting the disc to the top of the protuberance is at an angle at a range from 10 to 80 degrees with respect to a downward vertical line originated from the top of the protuberance.

* * * * *